US012623177B2

(12) United States Patent
Inaba et al.

(10) Patent No.: US 12,623,177 B2
(45) Date of Patent: May 12, 2026

(54) CARBON DIOXIDE REMOVAL APPARATUS, CARBON DIOXIDE DESORPTION DETERMINATION METHOD, AND CARBON DIOXIDE SEPARATION METHOD

(71) Applicant: HONDA MOTOR CO., LTD., Tokyo (JP)

(72) Inventors: Toshiyuki Inaba, Saitama (JP); Shumon Hoshino, Saitama (JP); Masanobu Takazawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 315 days.

(21) Appl. No.: 18/475,257

(22) Filed: Sep. 27, 2023

(65) Prior Publication Data

US 2024/0100467 A1     Mar. 28, 2024

(30) Foreign Application Priority Data

Sep. 28, 2022    (JP) ................................. 2022-155119

(51) Int. Cl.
B01D 53/04         (2006.01)

(52) U.S. Cl.
CPC ..... B01D 53/0454 (2013.01); B01D 53/0438 (2013.01); B01D 53/0446 (2013.01);
(Continued)

(58) Field of Classification Search
CPC ................ B01D 53/04; B01D 53/0438; B01D 53/0446; B01D 53/0454; B01D 2257/504;
(Continued)

(56) References Cited

U.S. PATENT DOCUMENTS

| | | | | |
|---|---|---|---|---|
| 10,682,603 B2 * | 6/2020 | Naito | ................... | B01D 53/265 |
| 10,710,019 B2 * | 7/2020 | Tanaka | ................... | C07C 7/144 |
| 2019/0255480 A1 | 8/2019 | Wurzbacher et al. | | |

FOREIGN PATENT DOCUMENTS

| | | |
|---|---|---|
| JP | 2002239330 A | 8/2002 |
| JP | 2007322223 A | 12/2007 |

(Continued)

OTHER PUBLICATIONS

Notification of Reasons for Refusal issued Jul. 23, 2024 in the JP Patent Application No. 2022-155119.

*Primary Examiner* — Sharon Pregler

(74) *Attorney, Agent, or Firm* — CKC & Partners Co., LLC

(57) ABSTRACT

Provided is a carbon dioxide removal apparatus that enables determination of whether or not carbon dioxide has desorbed from an adsorbent without using a carbon dioxide sensor. A carbon dioxide removal apparatus includes a carbon dioxide adsorption module, a first valve provided in an intake part of the carbon dioxide adsorption module, a second valve provided in a discharge part of the carbon dioxide adsorption module, a third valve connected to the discharge part, a vacuum pump connected to the carbon dioxide adsorption module via the third valve, and a controller. The carbon dioxide adsorption module includes a pressure meter and an adsorbent, and the controller is configured to perform, based on a pressure measured by the pressure meter, at least one of determining whether carbon dioxide has desorbed from the adsorbent or detecting an abnormality.

3 Claims, 2 Drawing Sheets

(52) U.S. Cl.
CPC .... *B01D 2257/504* (2013.01); *B01D 2258/06* (2013.01); *B01D 2259/40088* (2013.01); *B01D 2259/401* (2013.01)

(58) Field of Classification Search
CPC ...... B01D 2258/06; B01D 2259/40088; B01D 2259/401
See application file for complete search history.

(56) References Cited

FOREIGN PATENT DOCUMENTS

| | | | |
|---|---|---|---|
| JP | 2009143807 | A | 7/2009 |
| JP | 2016131920 | A | 7/2016 |
| JP | 2021148044 | A | 9/2021 |
| JP | 2023145852 | A | 10/2023 |

* cited by examiner

Figure 1:
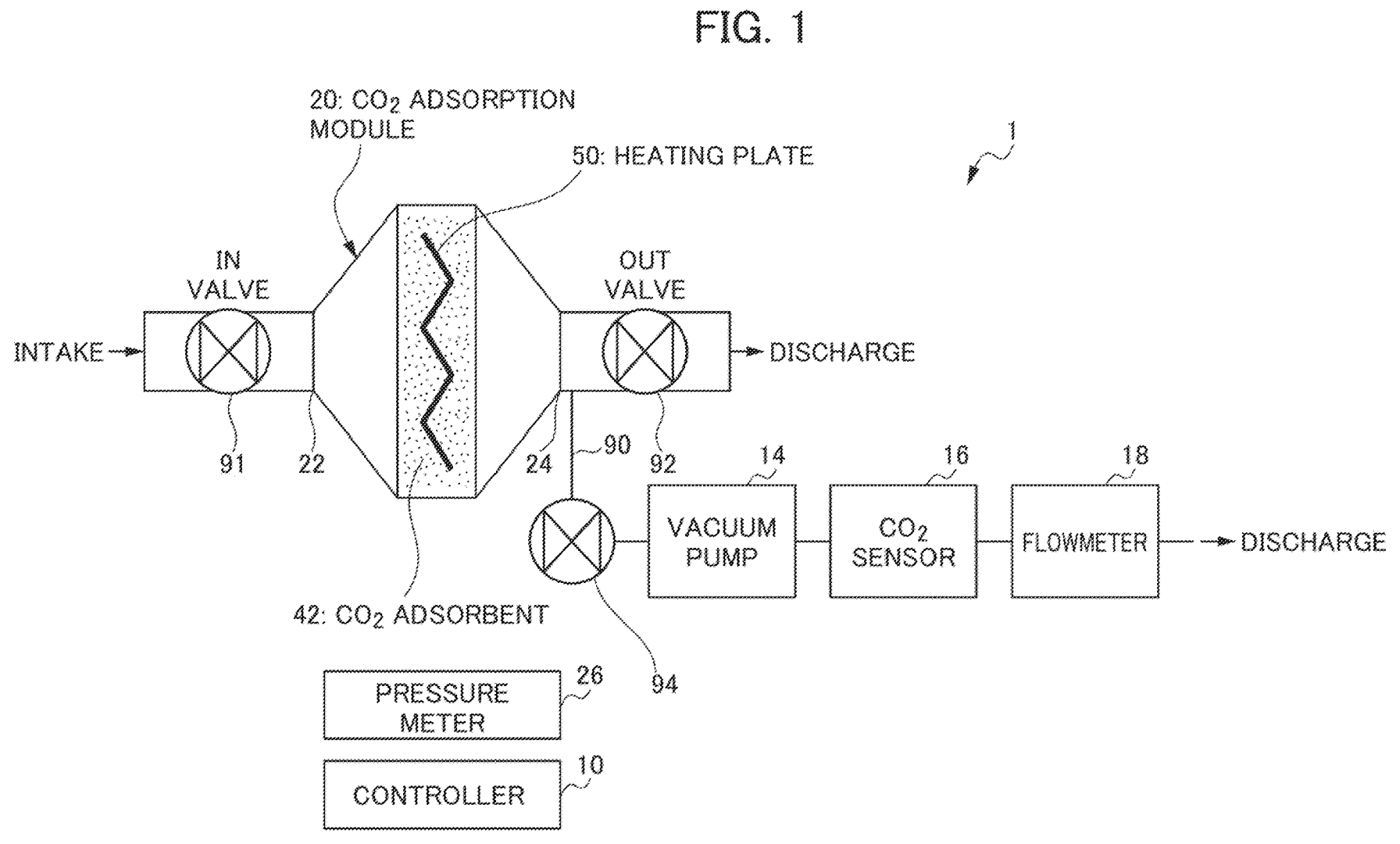

INTAKE

IN VALVE

91

22

20: CO₂ ADSORPTION MODULE

50: HEATING PLATE

42: CO₂ ADSORBENT

DISCHARGE

OUT VALVE

92

90

24

94

14

VACUUM PUMP

16

CO₂ SENSOR

18

FLOWMETER

DISCHARGE

26

PRESSURE METER

10

CONTROLLER

CARBON DIOXIDE REMOVAL APPARATUS, CARBON DIOXIDE DESORPTION DETERMINATION METHOD, AND CARBON DIOXIDE SEPARATION METHOD

CROSS REFERENCE TO RELATED APPLICATIONS

This application claims the benefit of priority to Japanese Patent Application No. 2022-155119 filed on Sep. 28, 2022. The entire contents of this application are hereby incorporated herein by reference.

BACKGROUND OF THE INVENTION

Field of the Invention

The present invention relates to a carbon dioxide removal apparatus, a carbon dioxide desorption determination method, and a carbon dioxide separation method.

Related Art

Efforts to mitigate climate change and reduce the effects of climate change are ongoing, and research and development to reduce carbon dioxide emissions are underway to achieve this goal. Some techniques have been proposed as the approaches to attain the goal. For example, according one proposed technique, carbon dioxide in the atmosphere is captured to be stored in the form of gas or liquid in the ground or the like. According to another proposed technique, captured carbon dioxide is used as a carbon source, and carbon is converted into valuable substances such as fuels and chemical products. In particular, with respect to carbon dioxide capture by direct air capture (DAC), it has been proposed to capture carbon dioxide by adsorption. For example, U.S. patent Application, Publication No. 2019/0255480 discloses a technique in which an adsorbent for adsorbing carbon dioxide is disposed in a plurality of layers on an adsorbent holding member.

Patent Document 1: U.S. Published Patent Application Publication, No. 2019/0255480

SUMMARY OF THE INVENTION

Incidentally, it is not easy to measure a concentration of carbon dioxide in a process for reducing carbon dioxide emissions by DAC. In DAC, desorption of carbon dioxide from an adsorbent takes place in a vacuum. On the other hand, ordinary carbon dioxide sensors are designed to be used under atmospheric pressure. For this reason, it is difficult to measure the concentration of carbon dioxide during a process step of desorbing carbon dioxide from the adsorbent. This means that it is difficult to determine whether or not carbon dioxide has desorbed from the adsorbent.

In view of the foregoing circumstances, it is an object of the present invention to provide a carbon dioxide removal apparatus and a carbon dioxide desorption determination method that enable determination of whether or not carbon dioxide has desorbed from an adsorbent without using a carbon dioxide sensor. Thus, the present invention contributes, by extension, to mitigating climate change and reducing the effects of climate change.

A first aspect of the present invention is directed to a carbon dioxide removal apparatus including: a carbon dioxide adsorption module; a first valve provided in an intake part of the carbon dioxide adsorption module; a second valve provided in a discharge part of the carbon dioxide adsorption module; a third valve connected to the discharge part; a vacuum pump connected to the carbon dioxide adsorption module via the third valve; and a controller. The carbon dioxide adsorption module includes a pressure meter and an adsorbent, and the controller is configured to perform, based on a pressure measured by the pressure meter, at least one of determining whether carbon dioxide has desorbed from the adsorbent or detecting an abnormality.

The carbon dioxide removal apparatus having the above-described configuration makes it possible to determine whether or not carbon dioxide has desorbed from the adsorbent without using a carbon dioxide sensor. The carbon dioxide removal apparatus can further detect an abnormality in the apparatus by the simple mechanism.

In the carbon dioxide removal apparatus according to a second aspect of the present invention, it is preferable that the controller detects different types of abnormalities according to a degree of increase in the pressure measured by the pressure meter.

The carbon dioxide removal apparatus according to the above aspect can detect a plurality of types of abnormalities by means of one meter.

In the carbon dioxide removal apparatus according to a third aspect of the present invention, it is preferable that the degree of increase in the pressure includes at least one of a pressure value at a point in time when a predetermined time has elapsed from a start of measurement of the pressure, or a rate of increase in the pressure within a predetermined period after the start of the measurement of the pressure.

The carbon dioxide removal apparatus can according to the above aspect can detect a plurality of types of abnormalities by way of simple evaluation of physical properties.

In the carbon dioxide removal apparatus according to a fourth aspect of the present invention, it is preferable that the controller determines that the carbon dioxide adsorption module is experiencing pressure leakage in a case where the degree of increase in the pressure measured by the pressure meter is higher than a predetermined value, and the controller determines that the adsorbent has deteriorated in a case where the degree of increase in the pressure measured by the pressure meter is lower than a predetermined value.

The carbon dioxide removal apparatus according to the above aspect can determine the contents of a plurality of types of abnormalities simply by way of comparison with the predetermined values.

In the carbon dioxide removal apparatus according to a fifth aspect of the present invention, it is preferable that in a case where in terms of a relationship between the intake part and the discharge part, a side closer to the intake part is defined to be upstream and a side closer to the discharge part is defined to be downstream, a carbon dioxide sensor is provided downstream of the vacuum pump, and the controller compares the pressure measured by the pressure meter with a detection result from the carbon dioxide sensor to thereby determine whether or not the carbon dioxide sensor has failed.

The carbon dioxide removal apparatus according to the above aspect can detect the presence or absence of a failure of the sensor by the simple mechanism.

In the carbon dioxide removal apparatus according to a sixth aspect of the present invention, it is preferable that the controller controls opening and closing of the third valve and actuation of the vacuum pump based on a measurement result from the pressure meter.

The carbon dioxide removal apparatus according to the above aspect can control the valve and the pump in conformity with the actual circumstances. This will lead to reduction of power consumption.

A seventh aspect of the present invention is directed to a carbon dioxide desorption determination method performable by a carbon dioxide removal apparatus including: a carbon dioxide adsorption module provided with a pressure meter and an adsorbent; a first valve provided in an intake part of the carbon dioxide adsorption module; a second valve provided in a discharge part of the carbon dioxide adsorption module; a third valve connected to the discharge part; and a vacuum pump connected to the carbon dioxide adsorption module via the third valve. The carbon dioxide desorption determination method includes: closing the first valve, the second valve, and the third valve; measuring a pressure in the carbon dioxide adsorption module by the pressure meter; and performing, based on the pressure measured by the pressure meter, at least one of determining whether carbon dioxide has desorbed from the adsorbent or detecting an abnormality.

The carbon dioxide desorption determination method described above makes it possible to determine whether or not carbon dioxide has desorbed from the adsorbent without using a carbon dioxide sensor. The carbon dioxide desorption determination method described above further makes it possible to detect an abnormality in the apparatus by the simple mechanism.

An eight aspect of the present invention is directed to a carbon dioxide separation method for separating carbon dioxide from air by a carbon dioxide removal apparatus including: a carbon dioxide adsorption module provided with a pressure meter and an adsorbent; a first valve provided in an intake part of the carbon dioxide adsorption module; a second valve provided in a discharge part of the carbon dioxide adsorption module; a third valve connected to the discharge part; a vacuum pump connected to the carbon dioxide adsorption module via the third valve; and a heater. The carbon dioxide separation method includes: allowing the adsorbent to adsorb carbon dioxide from air; reducing a pressure in the carbon dioxide adsorption module using the vacuum pump in a state in which the first and second valves are closed and the third valve is open; measuring the pressure in the carbon dioxide adsorption module by the pressure meter in a state in which the first, second, and third valves are closed and the heater is increasing a temperature of the adsorbent; and opening the third valve based on the pressure measured by the pressure meter and causing the vacuum pump to start reducing the pressure in the carbon dioxide adsorption module, thereby desorbing the carbon dioxide adsorbed on the adsorbent.

The carbon dioxide separation method described above makes it possible to, for example, control the valves and the pump at an appropriate timing, without using a carbon dioxide sensor. As a result, carbon dioxide separation can be efficiently performed by the simple apparatus configuration.

It should be noted that the first to eighth aspects can be combined as appropriate.

The present invention makes it possible to determine whether or not carbon dioxide has desorbed from the adsorbent without using a carbon dioxide sensor.

BRIEF DESCRIPTION OF THE DRAWINGS

FIG. 1 is a diagram schematically illustrating a configuration of a carbon dioxide removal apparatus of the present invention.

DETAILED DESCRIPTION OF THE INVENTION

Outline of Carbon Dioxide Removal Apparatus

Figure 2:
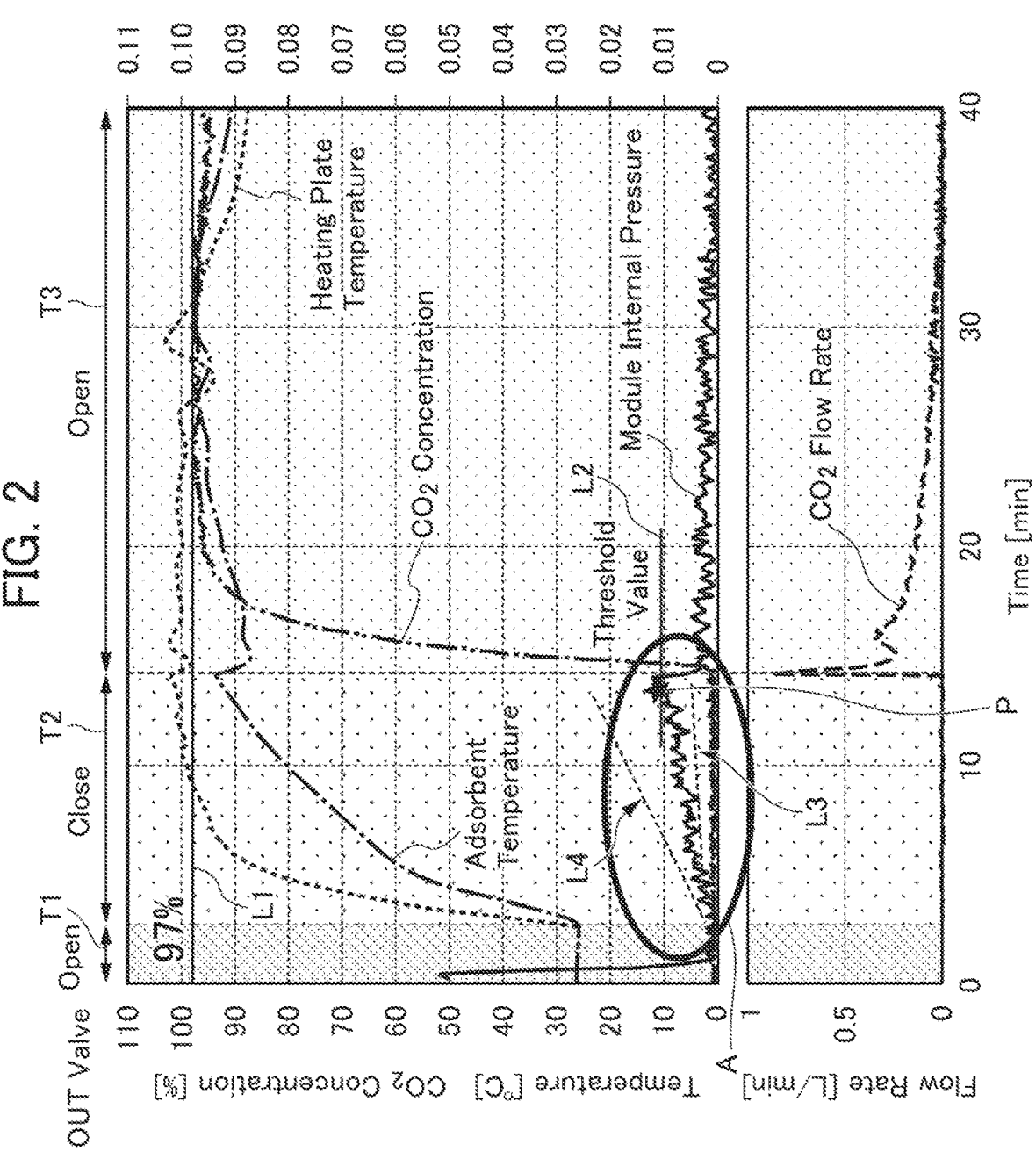
FIG. 2 is a graph illustrating a temperature and a pressure of a carbon dioxide adsorption module over time.

An example of embodiments of the carbon dioxide removal apparatus 1 of the present invention will be described with reference to the drawings. FIG. 1 is a diagram schematically illustrating a configuration of the carbon dioxide removal apparatus 1 according to the present embodiment. In the following description, a flow of gas from "INTAKE" to "DISCHARGE" shown in FIG. 1 is defined as a flow from an upstream side to a downstream side. The carbon dioxide removal apparatus 1 includes a carbon dioxide adsorption module 20, a path into which gas from the carbon dioxide adsorption module 20 is directly discharged, and a path into which gas from the carbon dioxide adsorption module 20 is discharged via a vacuum pump 14, a carbon dioxide sensor 16, and a flowmeter 18. The path for the direct discharge is for use in an adsorption step to be described later. The path for the discharge via the vacuum pump 14 is for use in a desorption step to be described later. The carbon dioxide adsorption module 20 is provided with an adsorbent 42 and a heating plate 50. The foregoing components are connected to each other with a pipe 90 and the like.

Specifically, an intake part 22 is provided in an upstream portion of the carbon dioxide adsorption module 20. A discharge part 24 is provided in a downstream portion of the carbon dioxide adsorption module 20. A first valve 91 is provided upstream of the intake part 22. A second valve 92 is provided downstream of the discharge part 24. A branch is provided between the discharge part 24 and the second valve 92. The pipe 90 extends from the branch and is provided with a third valve 94, the vacuum pump 14, the carbon dioxide sensor 16, and the flowmeter 18 in this order in the upstream-to-downstream direction. As can be seen, the discharge line from the discharge part 24 branches off into a first discharge line on which the second valve 92 is disposed and a second discharge line on which the third valve 94 is disposed. That is, the third valve 94 is disposed in parallel with the second valve 92. Furthermore, the carbon dioxide adsorption module 20 is provided with a pressure meter 26. These will be described later.

Controller

The carbon dioxide removal apparatus 1 is provided with a controller 10. The controller 10 controls the operation of each component, acquires information from each component, and performs other functions. For example, the controller 10 controls the operation of the pump, and the opening and closing of the valves. Moreover, the controller 10 acquires measurement values acquired by the sensor, the meter, and the like.

Outline of Carbon Dioxide Removal

An outline of carbon dioxide removal performed by the carbon dioxide removal apparatus 1 will be described. The carbon dioxide removal apparatus 1 collects carbon dioxide from air by allowing the adsorbent to adsorb carbon dioxide (adsorption step). After the collection, adsorbed carbon dioxide is desorbed from the adsorbent (desorption step). The desorbed carbon dioxide is compressed to be stored in a cylinder, thereby removing carbon dioxide from air. This process will be specifically described in the following.

Adsorption Step

In the adsorption step, the first valve 91 and the second valve 92 are opened, and the third valve 94 is closed. Air is taken in using a vacuum pump (not shown), a fan (not shown), or the like, and caused to pass through the carbon dioxide adsorption module 20. The carbon dioxide adsorption module 20 is provided with the adsorbent 42. Carbon dioxide in the air is adsorbed on the adsorbent 42 when the air passes through the carbon dioxide adsorption module 20.

(Desorption Step)

In the desorption step, the carbon dioxide adsorbed on the adsorbent 42 in the adsorption step is desorbed from the adsorbent 42. At this time, the first valve 91 and the second valve 92 are closed, and the third valve 94 is opened. Then, the vacuum pump 14 is driven to reduce the pressure inside of the frame. Furthermore, the carbon dioxide adsorption module 20 is heated by a heating device such as the heating plate 50. Consequently, carbon dioxide is desorbed from the adsorbent 42 and flows toward the downstream side. The desorbed carbon dioxide flows through the carbon dioxide sensor 16 and the flowmeter 18. Thus, an amount of the desorbed carbon dioxide can be grasped.

The desorbed carbon dioxide is compressed by a compressor (not shown) or the like and filled into a cylinder or the like. The cylinder or the like filled with the carbon dioxide is buried in the ground, for example. Thus, the removal of carbon dioxide from the air by the carbon dioxide removal apparatus 1 is completed.

The adsorption step and the desorption step will be specifically described with reference to FIG. 2. FIG. 2 is a graph illustrating changes in temperature, pressure, and the like of the carbon dioxide adsorption module 20 over time. The following description will be provided in chronological order.

Period T1

A period T1 is a period for transition from the adsorption step to the desorption step. In the period T1, for the transition from the adsorption step to the desorption step, air in the carbon dioxide adsorption module 20 is discharged. For this purpose, during the period T1, the IN valve, i.e., the first valve 91, and the OUT valve, i.e., the second valve 92, are closed. On the other hand, the third valve 94 is open. The vacuum pump 14 is on.

In the carbon dioxide removal apparatus 1 of the present embodiment, the carbon dioxide adsorption module 20 is provided with the pressure meter 26. Therefore, a pressure inside the carbon dioxide adsorption module 20 can be measured. In FIG. 2, the pressure inside the carbon dioxide adsorption module 20 measured by the pressure meter 26 is indicated as the module internal pressure.

As illustrated in FIG. 2, the module internal pressure decreases in the period T1. This is because the first valve 91 and the second valve 92 are closed, the third valve 94 is open, and the vacuum pump 14 is on. Around the middle of the period T1, the module internal pressure becomes substantially equal to zero.

The carbon dioxide adsorption module 20 is provided with the heating plate 50 as a heating device for heating the adsorbent 42. During the period T1, the heating plate is off. Therefore, both the heating plate temperature and the adsorbent temperature are approximate to room temperature.

Period T2

After the module internal pressure becomes substantially equal to zero, the period T1 ends following elapse of a certain period of time, and transition to a period T2 takes place. The period T2 is a preparation period for the desorption step. Specifically, the temperature of the adsorbent 42 is increased to facilitate the desorption of carbon dioxide from the adsorbent 42. For this purpose, the heating plate 50 is on during the period T2. As a result, as illustrated in FIG. 2, the temperature of the heating plate 50 rises. Then, the adsorbent temperature rises with a slight delay from the rise of the heating plate temperature.

In the carbon dioxide removal apparatus 1 of the present embodiment, during the period T2, the first valve 91 and the second valve 92 remain closed and the third valve 94 is also closed. The vacuum pump 14 is turned off. That is, the state in which the module internal pressure has been made equal to zero in the latter half of the period T1 is maintained. In this state, the module internal pressure is measured so that changes in the module internal pressure are observed.

During the period T2, the module internal pressure gradually increases in the usual case. This is because the carbon dioxide adsorbed on the adsorbent 42 gradually desorbs from the adsorbent 42. The circle A in FIG. 2 indicates a portion corresponding to the gradual increase.

Period T3

A period T3 corresponds to the desorption step. During the period T3, the first valve 91 and the second valve 92 remain closed, the vacuum pump 14 is turned on, and thereafter, the third valve 94 is opened. The heating plate 50 remains on. As a result, the desorption of carbon dioxide from the adsorbent 42 is accelerated, and the carbon dioxide is collected.

Temperature During Period T3

During the period T3, the heating plate temperature rises to a predetermined temperature, and then is controlled and maintained substantially at the predetermined temperature. The adsorbent temperature also rises to a temperature substantially approximate to the heating plate temperature and is maintained at the temperature.

Pressure During Period T3

The module internal pressure starts decreasing at the time of switching from the period T2 to the period T3. This is because the vacuum pump is turned on and the third valve 94 is switched from close to open. Thereafter, the module internal pressure gradually decreases, and in the latter half of the period T3, the module internal pressure becomes substantially equal to zero. This gradual decrease in the module internal pressure is caused due to a situation in which the desorption of carbon dioxide from the adsorbent 42 finishes and the vacuum pump 14 is on.

Carbon Dioxide Concentration during Period T3 Next, a concentration of carbon dioxide will be described. The carbon dioxide concentration is measured by the carbon dioxide sensor 16. The carbon dioxide concentration is measured not in a vacuum but under atmospheric pressure. Therefore, the carbon dioxide concentration can be measured by a normal carbon dioxide sensor.

The carbon dioxide concentration starts increasing immediately after the switching from the period T2 to the period T3. This is because carbon dioxide has desorbed from the adsorbent 42 to some extent during the period T2. The carbon dioxide concentration then remains as high as 97%, as indicated by the line L1. This is because the first valve is closed, whereby outside air is prevented from being newly introduced.

Carbon Dioxide Flow Rate During Period T3

Next, a flow rate of carbon dioxide will be described. The carbon dioxide flow rate is measured by the flowmeter 18. The carbon dioxide flow rate starts increasing immediately after the switching from the period T2 to the period T3. This is because carbon dioxide has desorbed from the adsorbent 42 to some extent during the period T2. Thereafter, the carbon dioxide flow rate gradually decreases. Then, near the end of the period T3, it becomes equal to zero. This is because the desorption of carbon dioxide from the adsorbent 42 finishes. The desorption step proceeds and ends in the above described way.

Determination of Carbon Dioxide Desorption

The carbon dioxide removal apparatus 1 of the present embodiment makes it possible to determine whether or not carbon dioxide has desorbed from the adsorbent 42 without having to install a carbon dioxide sensor in the carbon dioxide adsorption module 20. In other words, the determination of the carbon dioxide desorption can be made without measuring a concentration of carbon dioxide in a vacuum. The carbon dioxide desorption can be determined by means of the pressure meter 26 provided in the carbon dioxide adsorption module 20.

As described above, according to the present embodiment, the desorption step is preceded by the period during which the carbon dioxide adsorption module 20 is in a decompressed state, the pressure in the carbon dioxide adsorption module 20 is measured while the first valve 91, the second valve 92, and the third valve 94 are closed. This period is the period T2 described above. In the case where the pressure in the carbon dioxide adsorption module 20 has increased during the period T2, it can be determined that carbon dioxide has desorbed from the adsorbent 42 provided in the carbon dioxide adsorption module 20. This is because in the carbon dioxide adsorption module 20 in a closed state, there is no factor other than the desorption of carbon dioxide to increase the pressure.

As can be seen, according to the present embodiment, whether or not carbon dioxide has desorbed from the adsorbent 42 can be determined without using a carbon dioxide sensor, more specifically, without using a carbon dioxide sensor in a vacuum.

In the example shown in FIG. 2, the module internal pressure increases in the state in which the third valve 94 is closed, as indicated in the circle A in the period T2. Therefore, it can be determined that the carbon dioxide has desorbed from the adsorbent 42. This determination can be made by, for example, the controller 10.

Detection of Abnormalities

The carbon dioxide removal apparatus 1 of the present embodiment can detect different types of abnormalities in accordance with a degree of increase in the pressure measured by the pressure meter 26. The pressure measured by the pressure meter 26 refers to the pressure in the carbon dioxide adsorption module 20. The degree of increase in the pressure includes at least one of a pressure value at a point in time when a predetermined time has elapsed from the start of the measurement of pressure, or a rate of increase in the pressure within a predetermined period after the start of the measurement of pressure.

Specifically, for example, when the degree of increase in the pressure measured by the pressure meter 26 is higher than a predetermined value, it can be determined that the carbon dioxide adsorption module 20 is experiencing pressure leakage.

On the other hand, when the degree of increase in the pressure measured by the pressure meter 26 is lower than a predetermined value, it can be determined that the adsorbent 42 has deteriorated.

These determinations can be made by the controller 10. The predetermined values described above can be set with reference to a typical way in which the pressure increases during the period T2.

Pressure Leakage

In FIG. 2, L4 denotes a reference line with reference to which pressure leakage from the carbon dioxide adsorption module 20 is determined. When the increase in pressure during the period T2 exceeds the line L4, it is possible that the increase in pressure is caused not only by desorption of carbon dioxide from the adsorbent 42, but also by some other factors. It is highly probable that the factor other than the desorption of carbon dioxide is pressure leakage from the carbon dioxide adsorption module 20. Therefore, when the increase in pressure exceeds the line L4, the controller 10 determines that the carbon dioxide adsorption module 20 is experiencing pressure leakage.

Deterioration of Adsorbent

In FIG. 2, L3 denotes a reference line with reference to which deterioration of the adsorbent 42 is determined. When the increase in pressure during the period T2 does not exceed the line L3, it is possible that the desorption of carbon dioxide from the adsorbent 42 is insufficient. Therefore, when the increase in pressure does not exceed the line L3, the controller 10 determines that the adsorbent 42 has deteriorated.

Detection of Failures

Next, detection of failures will be described. In the following example, determination of the presence or absence of a failure of the carbon dioxide sensor 16 will be described. As described above, the carbon dioxide sensor 16 is used to check the outflow of carbon dioxide during the period T3. Here, in a case where the carbon dioxide sensor 16 does not detect an increase in the carbon dioxide concentration during the period T3 despite the fact that the module internal pressure has increased to the same or similar level to the normal level in the period T2, it can be determined that the carbon dioxide sensor 16 has failed. This is because although the increase in the module internal pressure during the period T2 indicates that carbon dioxide has desorbed, the carbon dioxide sensor 16 does not detect a corresponding increase in the carbon dioxide concentration.

Furthermore, the carbon dioxide removal apparatus 1 of the present embodiment is capable of detecting a failure of the pressure meter 26. For example, when a value of pressure indicated as a measurement value by the pressure meter 26 is lower than the line L3 or higher than the line L4, or repeatedly falls below the line L3 and rises above the line L4, it is possible that the pressure meter 26 has failed.

Valve Control

The carbon dioxide removal apparatus 1 of the present embodiment is capable of controlling the opening and closing of the third valve 94 and the operation of the vacuum pump 14 based on the measurement results from the pressure meter 26. This control can be performed by, for example, the controller 10. As described above, during the period T2, the third valve 94 is closed and the vacuum pump 14 is off. In contrast, during the period T3 corresponding to the desorption step, the third valve 94 is open and the vacuum pump 14 is on. The timing for switching from the period T2 to the period T3 can be determined based on the measurement results from the pressure meter 26. That is, the controller 10 can control the opening and closing of the third valve 94 and the operation of the vacuum pump 14 based on the measurement results from the pressure meter 26.

During the period T3, it is preferable to actuate the vacuum pump 14 after conditions for desorption of carbon dioxide from the adsorbent 42 are satisfied, for example, after the adsorbent temperature is sufficiently increased. This is because actuating the vacuum pump 14 during a period in which the conditions for carbon dioxide desorption are not satisfied leads to waste of power.

Therefore, a threshold value is set in advance for the increase in the module internal pressure during the period T2. When the module internal pressure reaches this threshold value in the period T2, the period T2 is finished and transition to the period T3 takes place. Specifically, when the module internal pressure reaches the threshold value, the vacuum pump 14 is turned on and the third valve 94 is opened. Thus, the desorption step can be efficiently performed without unnecessarily operating the vacuum pump 14.

FIG. 2 illustrates an example of the control. The threshold value for the module internal pressure during the period T2 is denoted by L2. A point at which the module internal pressure reaches the threshold value L2 is indicated by the star mark P. In response to the module internal pressure reaching the star mark P, the transition from the period T2 to the period T3 takes place. The transition from the period T2 to the period T3 based on the increase in the module internal pressure in this way allows for more accurate control in comparison with a case where the transition to the period T3 is controlled based on, for example, the heating plate temperature or the adsorbent temperature.

Carbon Dioxide Separation Method

In the case of separating carbon dioxide from air using the technique described above, for example, a method including the following steps can be adopted. The carbon dioxide separation method for separating carbon dioxide from air is performable by the carbon dioxide removal apparatus 1 including the carbon dioxide adsorption module 20 provided with the pressure meter 26 and the adsorbent 42, the first valve 91 provided in the intake part 22 of the carbon dioxide adsorption module 20, the second valve 92 provided in the discharge part 24 of the carbon dioxide adsorption module 20, the third valve 94 connected to the discharge part 24, the vacuum pump 14 connected to the carbon dioxide adsorption module 20 via the third valve 94, and the heater. The carbon dioxide separation method includes: an adsorption step of adsorbing carbon dioxide in air to the adsorbent 42; a decompression step of reducing a pressure in the carbon dioxide adsorption module 20 by the vacuum pump 14 in a state in which the first valve 91 and the second valve 92 are closed and the third valve 94 is opened; a pressure measurement step of measuring the pressure in the carbon dioxide adsorption module 20 by the pressure meter 26 in a state in which the first valve 91, the second valve 92, and the third valve 94 are closed, and in which heating by the heater is in operation; and a desorption step of opening the third valve 94 based on the pressure measured by the pressure meter 26 and causing the vacuum pump 14 to start reducing the pressure in the carbon dioxide adsorption module 20, thereby desorbing carbon dioxide adsorbed on the adsorbent 42.

According to this method, the transition from a step to the next step can be appropriately performed without using a carbon dioxide sensor in a vacuum. In particular, the transition from the decompression step to the desorption step via the pressure measurement step can be performed at an appropriate timing. As a result, inefficient power consumption due to driving the vacuum pump or the like is suppressed, and consequently, carbon dioxide separation can be performed with efficiency.

It should be noted that the present invention is not limited to the embodiment described above, and various changes, modifications and combination thereof may be made to the present invention.

EXPLANATION OF REFERENCE NUMERALS

1: Carbon dioxide removal apparatus
10: Controller
14: Vacuum pump
16: Carbon dioxide sensor
25
18: Flowmeter
20: Carbon dioxide adsorption module (Adsorbent-holding
member)
22: Intake part
24: Discharge part
26: Pressure meter
42: Adsorbent
50: Heating plate (Heater)
90: Pipe
91: First valve
92: Second valve
94: Third valve
X-direction: Lateral width direction
Y-direction: Height direction
Z-direction: Depth direction

What is claimed is:

1. A carbon dioxide removal apparatus comprising:
a carbon dioxide adsorption module;
a first valve provided in an intake part of the carbon dioxide adsorption module;
a second valve provided in a discharge part of the carbon dioxide adsorption module;
a third valve connected to the discharge part;
a vacuum pump connected to the carbon dioxide adsorption module via the third valve; and
a controller,
the carbon dioxide adsorption module comprising a pressure meter and an adsorbent,
the controller being configured to
bring a pressure in the carbon dioxide adsorption module into a predetermined reduced pressure state by operating the vacuum pump in a state in which the first valve and the second valve are closed and the third valve is open, and thereafter, and
perform determination and/or detection based on a degree of increase in the pressure in the carbon dioxide adsorption module measured by the pressure meter in a state where the first, second, and third valves are all closed, wherein
the controller determines that carbon dioxide has desorbed from the adsorbent, in a case where the degree of increase in the pressure is greater than 0,
the controller detects an abnormality indicating that the carbon dioxide adsorption module is experiencing pressure leakage, in a case where the degree of increase in the pressure is higher than a predetermined first value, and
the controller detects an abnormality indicating that the adsorbent has deteriorated, in a case where the degree of increase in the pressure is lower than a predetermined second value, and
the degree of increase in the pressure includes at least one of a pressure value at a point in time when a predetermined time has elapsed from a start of measurement of the pressure, or a rate of increase in the pressure within a predetermined period after the start of the measurement of the pressure.

2. A carbon dioxide desorption determination method performable by a carbon dioxide removal apparatus including: a carbon dioxide adsorption module provided with a pressure meter and an adsorbent; a first valve provided in an intake part of the carbon dioxide adsorption module; a second valve provided in a discharge part of the carbon dioxide adsorption module; a third valve connected to the discharge part; and a vacuum pump connected to the carbon dioxide adsorption module via the third valve, the carbon dioxide desorption determination method comprising:

bringing a pressure in the carbon dioxide adsorption module into a predetermined reduced pressure state by operating the vacuum pump in a state in which the first valve and the second valve are closed and the third valve is open, closing the first valve, the second valve, and the third valve;

measuring a pressure in the carbon dioxide adsorption module by the pressure meter; and performing determination and/or detection based on a degree of increase in the pressure in the carbon dioxide adsorption module measured by the pressure meter, the performing determination and/or detection including:

determining that carbon dioxide has desorbed from the adsorbent in the carbon dioxide adsorption module, in a case where the degree of increase in the pressure is greater than 0;

detecting an abnormality indicating that the carbon dioxide adsorption module is experiencing pressure leakage, in a case where the degree of increase in the pressure is higher than a predetermined first value, and detecting an abnormality indicating that the adsorbent has deteriorated, in a case where the degree of increase in the pressure is lower than a predetermined second value, wherein in the detecting the abnormalities, the degree of increase in the pressure includes at least one of a pressure value at a point in time when a predetermined time has elapsed from a start of measurement of the pressure, or a rate of increase in the pressure within a predetermined period after the start of the measurement of the pressure.

3. A carbon dioxide separation method for separating carbon dioxide from air by a carbon dioxide removal apparatus including: a carbon dioxide adsorption module provided with a pressure meter and an adsorbent, a first valve provided in an intake part of the carbon dioxide adsorption module; a second valve provided in a discharge part of the carbon dioxide adsorption module; a third valve connected to the discharge part; a vacuum pump connected to the carbon dioxide adsorption module via the third valve; and a heater, the carbon dioxide separation method comprising:

allowing the adsorbent to adsorb carbon dioxide from air;

reducing a pressure in the carbon dioxide adsorption module using the vacuum pump in a state in which the first and second valves are closed and the third valve is open;

continuously measuring the pressure in the carbon dioxide adsorption module by the pressure meter in a state in which the first, second, and third valves are closed and the heater is increasing a temperature of the adsorbent; and opening the third valve after the pressure measured by the pressure meter has stopped increasing, and causing the vacuum pump to start reducing the pressure in the carbon dioxide adsorption module, thereby desorbing the carbon dioxide adsorbed on the adsorbent.

\*   \*   \*   \*   \*